Jan. 10, 1950      E. W. STURK      2,494,318

APPAREL RACK FOR VEHICLES

Filed Aug. 17, 1948

Inventor
EARL W. STURK

Attorney

Patented Jan. 10, 1950

2,494,318

UNITED STATES PATENT OFFICE 2,494,318

APPAREL RACK FOR VEHICLES

Earl W. Sturk, Lansing, Mich.

Application August 17, 1948, Serial No. 44,783

1 Claim. (Cl. 224—29)

This invention relates to an apparel supporting rack and more particularly to such a rack adapted for use in a passenger automobile and to support the clothes in draped condition.

The problem of transporting clothes while traveling has long been one giving considerable trouble to the average traveler. Although the hanging of clothes while mounted upon a clothes hanger from convenient hooks such as those frequently provided in association with the strap mounting in a passenger automobile has long been standard practice for many travelers, this method has several serious disadvantages. The clothes, when so hung, are pressed tightly against the inside surface of the automobile. This creates considerable inconvenience when the door of the automobile is closed, the clothes frequently becoming caught between the door and the frame. Furthermore, the number of articles which may be so hung is extremely limited since all of the hangers supported by a small hook are forced tightly against the inside of the car. It is, therefore, desirable to provide a rack which will accommodate an appreciable number of items and at the same time will permit them to hang free from contact with the side, seat or floor of the automobile.

In designing such a rack it is desirable to provide a unit which may be easily and simply placed within the back seat compartment of a passenger automobile and when so placed will remain stable even though the automobile is subjected to violent braking action or quick acceleration. It is also highly desirable that the rack be so constructed that it has this characteristic of stability without permanent or positive attachment to any part of the automobile structure. It is also desirable that the rack be made adjustable to fit the various sizes and shapes of automobile structures, but at the same time the design should incorporate sufficient features of simplicity to insure economical manufacture and a minimum of weight.

In view of these problems it is a primary object of my invention to provide an apparel rack for an automobile from which the clothes may hang freely without wrinkling or folding.

It is a further object of my invention to provide such a rack which will maintain its stability of position without positive attachment to the automobile structure.

It is a still further object of my invention to provide such a rack which may be quickly and simply adjusted to fit various sizes and types of automobile compartments.

It is an additional object of my invention to provide such a rack which may be easily and quickly installed or removed.

A further object of my invention is to provide a rack the design of which lends itself to simple and economical manufacture.

Other objects and purposes of this invention will become apparent to those familiar with this type of equipment upon referring to the accompanying drawings and upon reading the following specification.

In meeting the objects and purposes of my invention I have provided a rack consisting of a horizontal ridge member and a vertical supporting leg, in which both the position of the leg longitudinally of the ridge member and the length of the leg may be changed by simple adjustments. The lower end of the leg is provided with an offset portion giving it a broad lateral base to overcome lateral instability.

For illustration of a proved, but by no means the only, embodiment of my invention, attention is directed to the accompanying drawings.

Figure 1:
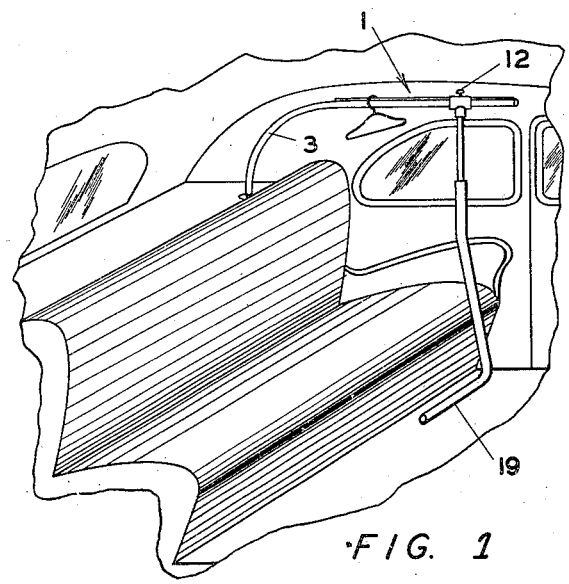
Figure 1 is an oblique view of my apparel rack installed in operating position in a vehicle.
Figure 2:
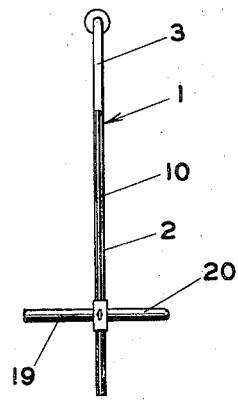
Figure 2 is a top view of my apparel rack.
Figure 3:
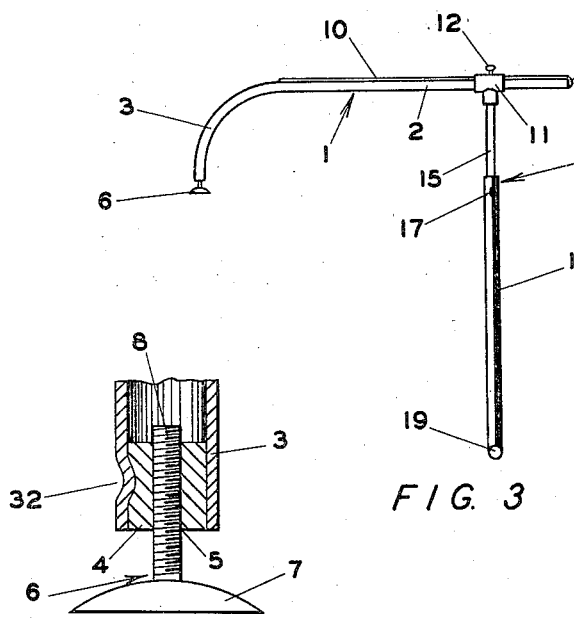
Figure 3 is a side elevation view of my apparel rack.
Figure 4:
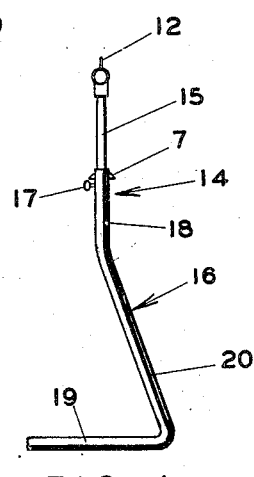
Figure 4 is a front elevation view of my apparel rack.
Figure 5:
Figure 5 is an enlarged fragmentary sectional view of one end of the ridge member of my rack.

In the following description the terms "upper" and "lower" are freely used and are to be taken to mean in relation to the rack as installed in an automobile in the position shown in Figure 1. The term "lateral" is to be taken as meaning in a direction across the body of an automobile as opposed to its longitudinal direction. The terms "forward" and "rearward" refer to the longitudinal extent of the rack in relation to the forward or rearward end of the automobile.

Referring to the drawings in detail, the numeral 1 indicates a tubular ridge member having a straight portion 2 throughout the greater part of its length and an arcuate rearward end portion 3 curving downwardly. Although the ridge member 1 may be of any desired shape such as hexogonal or square and may be solid or tubular, the tubular form described is preferable since it fits the hook of the standard clothes hanger and provides sufficient strength without unnecessary weight. It is of length sufficient that, with the rearward end portion supported on the seat back, the forward end will extend sufficiently forwardly of the forwardmost part of the seat that garments hung near such forward end will hang clear of, or substantially clear of, the seat.

A plug 4 of suitable material, such as aluminum or steel, is inserted in the end of the arcuate portion 3 and held in place by any suitable means, such as a crimp 32. A threaded opening 5 substantially concentric with the walls of the arcuate portion 3 extends through the plug 4 and provides a positive engagement for the adjustable base 6. The adjustable base 6 is composed of a resilient cup 7 and an upwardly extending threaded rod 8, the latter extending through the opening 5.

The forward end of the straight portion 2 of the ridge member is provided with a large resilient cap 9 to render this end non-injurious to both personnel and the automobile in the event of contact with the rack. A resilient strip 10 is cemented to the upper surface of the straight portion 2 of the ridge member throughout the greater part of its length. The cup 7, cap 9, and strip 10 may be made from any suitable material such as rubber or plastic so long as the material does not have a hard inflexible surface.

A T 11 is slidably mounted upon the forward part of the straight portion 2 of the ridge member 1. A manually operable clamp element 12 extends through the upper side of the T 11 in threaded relation thereto to engage the ridge member 1 when tightened.

A leg unit 14 having an upper part 15 and a lower part 16 supports the forward end of the ridge member 1. The top of the upper part 15 is received into and is rigidly attached to the T 11. The lower portion of the upper part 15 is slidingly received into the upper portion of the lower part 16 of the leg unit 14. A clamp element 17 threadedly engaging the lower part 16 provides a positive engagement between the upper part 15 and the lower part 16 when tightened and prevents further relative movement between the parts. The lower part 16 consists of a vertical part 18 adapted to slidingly receive the upper part 15 and a horizontal part 19 integrally joined together by an inclined part 20. The lower part 16, as thus formed, and in operative position, is offset laterally such that the horizontal portion 19, preferably having a width substantially that of a standard coat hanger, is positioned to extend laterally substantially equidistant on each side of the vertical portion 18. In this manner a broad lateral base is provided capable of supporting the rack against rotation about its point of contact with the floor of the automobile. The same functional result may be obtained by using a simple T-arrangement with the base welded or otherwise suitably affixed to the bottom of the leg unit 14. The length of the respective leg portions should be sufficient that with appropriate adjustment of the telescoping parts the ridge member 1 may be positioned horizontally in the particular automobile in which it is to be used.

The upper and lower parts of the leg unit 14 may be made from any suitable structural shape so long as it is possible to telescope them, however, a tubular shape is preferable because of its combination of strength and light weight. The material for both the ridge member and the leg unit 14 may be any suitable material. However, if a metal other than aluminum, stainless steel or magnesium is used the various parts should be plated to impart a pleasing appearance and to prevent corrosion.

The rack may be adjusted to its smallest dimensions for insertion in the automobile and thereafter extended so that the ridge member 1 is positioned above the seat a sufficient distance to permit a garment of average length to hang freely without contact with the seat. This adjustment is made by turning the adjustable base 6 on the arcuate portion 3 of the ridge member 1 to an extended position. The length of the leg unit 14 is then adjusted to level the ridge member 1 and the position of the leg unit 14 longitudinally of the ridge member 1 is adjusted to place the leg member close to, or contacting, the forward part of the seat. The horizontal part 19 of the leg unit 14 rests upon the floor of the automobile.

In position, the adjustable base 6 rests upon the top of the seat back and the horizontal portion 19 rests on the floor. The garments are hung by means of hangers on the ridge member 1. Long garments may be hung on the part of the ridge pole forwardly of the leg unit and short garments on the part rearwardly thereof. The strip 10 on the top of the ridge member 1 prevents the hangers from sliding along the ridge member. The horizontal portion 19 of the leg unit 14 prevents the rack from tipping sideways. The weight of the garments on the ridge member 1 prevents the rack from tipping forwardly. The use of a resilient cup on the end of the adjustable base 6 prevents the rack from sliding in any direction. Thus, although the parts are simple, a rack of surprising stability is provided.

Although the preceding description and accompanying drawings apply to a preferred embodiment of the invention, it is not my intention, implied or otherwise, to eliminate other variations or modifications which do not depart from the scope of my invention unless specifically stated to the contrary in the hereinafter appended claim.

I claim:

An apparel rack for an automobile vehicle comprising: a tubular ridge member having a straight portion and a downwardly turning portion, said arcuate portion comprising one extremity of said ridge member; a resilient strip mounted along the top surface of said ridge member throughout a substantial part of the straight portion thereof; a leg member having a tubular upper portion and a tubular lower portion telescopically receiving the upper portion thereinto; threaded means for locking in a selected position said upper and lower portions against movement relative to each other; said lower portion of said leg member including a vertical part and a base part integrally joined by an inclined part, said base part being so associated with said vertical part that said vertical part is aligned vertically above a point substantially midway between the ends of said base part; a T-shaped joining member rigidly engaging the upper portion of said leg member and slidably engaging said ridge member; threaded means associated with said joining member for locking in a selected position said joining member against movement relative to said ridge member; a vertically adjustable mount having a resilient cup on its lower extremity threadedly engaging the arcuate end of said ridge member; whereby the free end of said arcuate portion may rest on a surface immediately back of an automobile seat back and the leg member may rest on the floor ahead of the seat and the straight portion of the ridge member held horizontal therebetween and thereby.

EARL W. STURK.

REFERENCES CITED

The following references are of record in the file of this patent:

UNITED STATES PATENTS

| Number | Name | Date |
|---|---|---|
| 368,647 | Bunker | Aug. 23, 1887 |
| 1,015,448 | Madden | Jan. 23, 1912 |
| 1,286,087 | Petus et al. | Nov. 26, 1918 |
| 1,791,514 | Smelker | Feb. 10, 1931 |
| 2,144,772 | Plants | Jan. 24, 1939 |
| 2,155,772 | Porter | Apr. 25, 1939 |
| 2,196,196 | Dorsey | Apr. 9, 1940 |
| 2,302,300 | Davies | Nov. 17, 1942 |